April 14, 1959 A. J. HENQUET ET AL 2,882,344

GROUP SELECTION SYSTEM

Filed Jan. 31, 1956 2 Sheets-Sheet 1

Inventors
A. J. HENQUET
J. J. PERROT
By [signature]
Attorney

Inventors
A. J. HENQUET-
J. J. PERROT
By Robert Harding Jr.
Attorney

United States Patent Office 2,882,344

Patented Apr. 14, 1959

2,882,344

GROUP SELECTION SYSTEM

Andre Jean Henquet and Jean Jacques Perrot, Boulogne-Billancourt, France, assignors to International Standard Electric Corporation, New York, N.Y., a corporation of Delaware Application January 31, 1956, Serial No. 562,545

Claims priority, application France February 4, 1955

6 Claims. (Cl. 179—18)

The present invention relates to switching systems, such as those used in automatic telephony to effect group selections.

Two types of selections are generally considered in automatic telephony: in the first type of selection, a sole predetermined output circuit is to be hunted, which is, for instance, the case for the final selection of the requested subscriber; in the other type of selection, a free output circuit is to be hunted among a group of identical circuits; this latter type of selection is known as "group selection," as is for instance the case for the selection of a free outgoing junction towards the requested subscriber's exchange.

In addition in the automatic telephone art, complex circuits are known which are designated in the following description as "group selection units" and comprises for instance, $n$ inputs and $p$ outputs interconnected by switching means in such a way that each input is given Such group selection units are usually associated with one or several switching control devices, known as "makers." The input indication and the output-group indication are transmitted to one of the markers, and the marker is provided so as to hunt for an assembly of circuits which can effect the connection of the input thus determined to one of the free outputs of the group and then control the establishment of the connection.

One object of the present invention is to provide a group selection arrangement in which the switching means are grouped so as to constitute identical group selection units.

Another object of the present invention is to provide a group selection arrangement of the above-mentioned type by means of which the capacity of such a group selection arrangement may be increased easily and to a large extent.

According to one feature of the invention, a method for connecting A input circuits and B output circuits to a group selection arrangement constituted by identical group selection units, each comprising $n$ inputs and $p$ outputs, consists in associating $$\frac{A}{n}\times\frac{B}{p}$$

group selection units (thus constituting $$\frac{B}{p}$$

assemblies of $$\frac{A}{n}$$

unit), where $a$ is a multiple of $n$ and B is equal to $$\frac{Ap}{n}$$

in multipling each input circuit to corresponding inputs in each of the assemblies, in associating each output circuit with a single assembly and in multipling said output circuit within the assembly to which it is associated to corresponding outputs of each unit of said assembly.

According to a further feature of the invention, when the incoming circuits are equally distributed in all the assemblies, the outgoing circuits are connected to $$\frac{A}{n}$$

units eventually belonging to different assemblies but having access to different incoming circuits.

According to a further feature of the invention, a group selection arrangement constituted from identical group selection units to which the incoming junctions and the outgoing junctions are connected in accordance with the above-mentioned method, comprises in combination registers, means having access to the incoming junctions and, to registers and which are adapted to detect a calling incoming junction, to connect it to a free register, and to transmit an indication on the identity of said incoming junction to the register, said register being adapted to receive and register the indication on the identity of said incoming junction as well as the indication on the requested group of outgoing junctions transmitted by said incoming junction, means having access to the outgoing junction and to the registers, said means being adapted to receive the requested group indication from the registers, to hunt for the selection units to which the incoming junction as well as at least one of the free outgoing junctions in the requested direction are connected, to select one of said units, and to connect said register to a marker associated with this selection unit, said register being moreover adapted to transmit after this connection the indication on the incoming junction and the indication on the requested group of outgoing junctions to said marker.

According to a further feature of the invention, in such a group selection arrangement, one or several marking circuits are associated with several group selection units and means having access to the outgoing junctions and, to the registers are provided in order to hunt for an assembly of group selection units served by the same markers and to which the calling incoming junction and at least one free outgoing junction in the requested direction are connected, then to connect said register to a free marker associated with this assembly of group selection units, said register being provided so as to transmit to said marker the indications on the identity of the calling incoming junction and on the requested group of outgoing junctions.

According to a further feature of the invention, in such a group selection arrangement, one or several markers are associated with the $$\frac{A}{p}$$

group selection units of an assembly for group selection whose inputs are connected to the A incoming junctions.

According to a further feature of the invention, in such a group selection arrangement, one or several markers are associated with an assembly of $$\frac{B}{p}$$

group selection units on whose inputs $n$ incoming junctions are multipled, said group selection units having access to B outgoing junctions, and means are provided in order that the indications on the identity of the calling incoming junction transmitted to the register may determine the marker(s) liable to control the connection.

According to a further feature of the invention, in such a group selection arrangement, the means having access to A incoming junctions and to the registers ($m$ for instance) comprise in combination an A-input and $m$-output register-finder, the A incoming junctions multipled on the assembly of group selection units being also multipled on the A inputs of the register-finder whose inputs are connected to the $m$ registers, and means to detect a calling incoming junction, to identify it, to connect it by means of said register-finder A to a free register, and to transmit the identity of said calling incoming junction to said register.

According to a further feature of the invention, in such a group selection arrangement, the outgoing junctions of the same group associated with an assembly of group selection units served by the same markers are associated with means adapted continuously to provide an indication on the availability of at least one junction in this group of outgoing junctions joined to the same assembly, the information concerning the groups of outgoing junctions continuously providing an indication on the assemblies of group selection units liable to serve the call.

According to a further feature of the invention, the switching devices proper of two or several group selection arrangements are connected in parallel, the homologous inputs and the homologous outputs are interconnected and the switching control devices are common.

According to a further feature of the invention, the switching units are constituted from units comprising E inputs and E outputs, said units being liable to be adapted to specific requirements by multipling a number of inputs, a number of outputs, or a number of inputs and a number of outputs.

Further objects, features and advantages of the present invention will be disclosed in the following description of an embodiment, said description being made in connection with the accompanying drawings in which.

The group selection arrangement represented on Fig. 1 is constituted from the standpoint of the switching devices by associating identical elements called in the following description "group selection units."

Although the invention may be applied to systems using any switching means, such as rotary switches, in modifications obvious to the skilled personnel, the case of an arrangement making use of "cross-bar switches" which are often called multi-switches, will be hereinafter described.

A group selection unit such as SG11 is constituted by associating a number of cross-bar switches constituting a primary stage with a number of cross-bar switches constituting a secondary stage. The interconnection between the switches of the primary stage and the switches of the secondary stage is effected by means of internal links so that each input of the primary stage has access through one or several channels to each output of the switches of the secondary stage. The switches of such a group selection unit are associated with a switching control arrangement, usually called a "marker," which is provided in order to hunt and then to establish a connection within the group selection unit according to the information transmitted to it. In the specific case under consideration, the marker is adapted to receive an indication on the input and an indication on a group of outputs; it hunts subsequently for a free channel between said input and a free output of the group; and it then causes the establishment of the connection. For reasons which will be easily understood by the skilled personnel, it is not usually necessary to associate a marker with each group selection unit and, in the case under consideration in particular, it is often preferable to associate one or several markers, usually two of them, with a number of group selection units, each marker being liable to be connected to each group selection unit by means of a connecting device of the usual kind.

The group selection units can be provided for instance so as to comprise an equal number of inputs and outputs and be then adapted to the different requirements, either by multipling a number of inputs or by multipling a number of outputs or by multipling a number of inputs as well as a number of outputs. Units comprising, for instance, 400 inputs and 400 outputs may be used.

Figure 1:
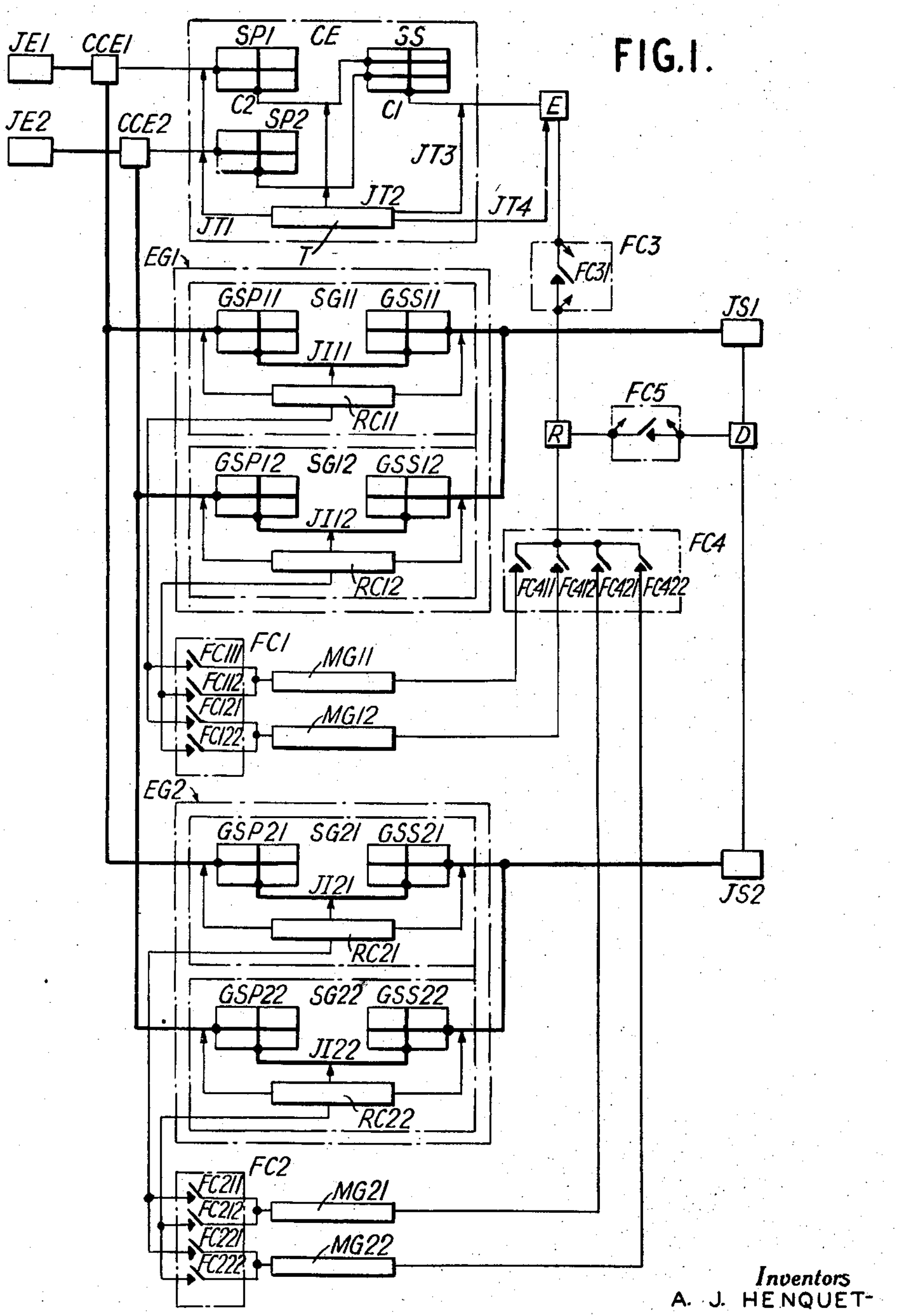
Fig. 1 represents diagrammatically the embodiment of a group selection arrangement carrying out features of the invention.

The group selection arrangement represented on Fig. 1 is constituted by associating a number of assemblies for group selection which are themselves constituted from identical elements for group selection. It is assumed in the case under consideration that group selection units of 400 inputs and 400 outputs are used. An assembly for group selection, such as EG1, is constituted in the specific case by two group selection units SG11 and SG12, each represented within a frame in dot-and-dash lines.

In order to simplify the drawing, only one switch of the primary stage, GSP11 and GSP12, respectively, only one switch of the secondary stage, GSS11 and GSS12, and only one internal junction J111 and J112, respectively, have been represented in each group selection unit. An assembly of connecting relays, RC11 and RC12, respectively, have also been represented for each group selection unit. The homologous outputs of the group selection units of the same assembly, such as EG1, are multipled so that an assembly for group selection, such as the one represented on Fig. 1, can receive 400 outgoing junctions, such as JS1. The inputs of an element for group selection, such as EG1, can receive 800 (400×2) incoming junctions such as JE1 and JE2. It will be considered, for instance, that the system represented on Fig. 1 is provided for 800 incoming junctions and 800 outgoing junctions. A second assembly for group selection EG2, identical to the assembly for group selection EG1, has been consequently provided. In the assembly EG2, the elements identical to those of the assembly EG1 have been represented with similar references, the only difference between the references lying in the fact that the numerical part of the reference comprises 2 as a tens digit instead of 1 in case of assembly EG1. The homologous inputs of the assemblies EG1 and EG2 are multipled and the 400 outputs of the assembly for group selection permit the connection to 400 new outgoing junctions such as JS2. Two markers MG11 and MG12 are associated with each assembly for group selection, such as EG1. These markers have access to the different group selection units of the assembly through a common switching arrangement, constituted by the group of connecting wires FC1, as well as through switching elements proper to each group selection unit, constituted by connecting relays such as RC12. In the case under consideration, each of the markers MG11 and MG12 has access to each group selection unit of the assembly EG1.

Markers MG11 and MG12 can moreover be connected through the group of connecting wires FC4 to a receiving circuit R whose operation will be explained further on. This receiving circuit has also access, through the same group of connecting wires FC4, to the two other markers MG21 and MG22 which are associated with the assembly for group selection EG2 and which have access to the group selection units SG21 and SG22 of assembly EG2 by means of the group of connecting wires FC2.

A register-finding circuit has been represented in CE, Fig. 1, within a frame, in dot-and-dash lines; this circuit is constituted by a switching arrangement having a number of inputs equal to the number of incoming junctions or, in other words, equal to the number of the assemblies for group selection, and a number of outputs equal to the number of registers E whose purpose will be explained further on. The switching arrangement constituted by the register-finding circuit CE is provided as usual in such a way that each input has access to each output through at least one channel. The incoming connecting circuits CCE1 and CCE2, respectively associated with the incoming junctions JE1 and JE2, are connected to the inputs of the register-finder. A testing circuit T is associated with the register-finder CE and it has access to the inputs through connection JT1, to the internal junctions through connection JT2, to the outputs through connection JT3 and to the different registers through connection JT4. In the specific case under consideration, the switching arrangement of register-finder CE has two stages, the first stage having been represented by means of two cross-bar multi-switches SS. The testing circuit is adapted to detect a calling incoming junction, to hunt then for a free register and a connecting channel between said calling junction and said free register and, then, to cause the connection of the calling incoming junction to register E by means of the switches of the two stages. The testing circuit which detects the calling incoming junction is also provided so as to ascertain this junction, for example, by identifying the input to which it is connected and to transmit its identity, through connection JT4, to register E which has been associated with the calling incoming junction. It will be easily understood that the identity of the calling incoming junction, which has been determined, for instance, in accordance with the input of the register-finder to which it is connected, enables the determination thanks to simple means, of the input to which this junction is connected in the different assemblies for group selection EG1 and EG2. This can be obtained, thanks to means, such as a correlation table, or by connecting the junctions to the different inputs of the assemblies for group selection EG1 and EG2 according to a predetermined law, or by always connecting the incoming junctions in the same order to the inputs of the register-finder CE and to the inputs of the assemblies for group selection EG1 and EG2. As explained hereinabove, such a group selection arrangement has several registers E and several receiving circuits R. Each register has access to a number of receiving circuits by means of the group of connecting wires FC3 which may be constituted in the standard way. It is therefore to be understood that, under such conditions, each receiving circuit has access, through the medium of each receiver R (or a limited number of receivers R) and the associated group of connecting wires, such as FC4, to each of the marking circuits.

All the outgoing junctions, such as JS1 and JS2, are also connected to circuit D which is constituted by a field of points and which has one point per direction and per assembly for group selection. Each point is carried to a characteristic potential when there is in the assembly at least one free outgoing junction in the associated direction. This can be obtained by providing in each outgoing junction a relay break contact, all the break contacts associated with the outgoing junctions towards the same direction and connected to the outputs of the same assembly for group selection being connected in parallel and leading to the point corresponding to this direction and to this assembly. Continuous indications, sorted out according to each outgoing direction as well as to each assembly for group selection, a characteristic potential, or a source of current, liable to be connected to the points corresponding to the outgoing directions having at least one free outgoing junction, as regards each assembly for group selection, can therefore be available, thanks to this set of points. Each receiver R has access to the different points of device D by means of a group of connecting wires, such as FC5.

Figure 2:
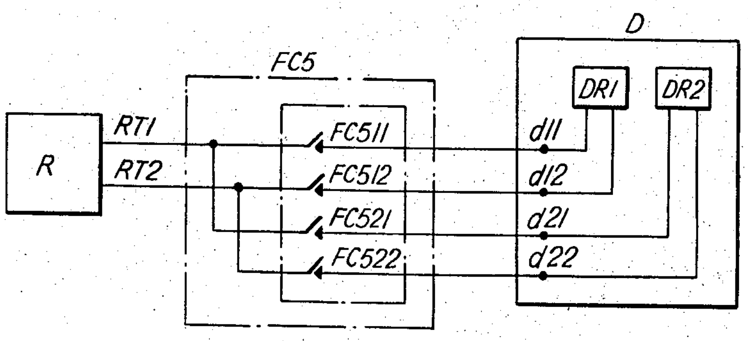
Fig. 2 represents diagrammatically the embodiment of a group of connecting wires which can be used in connection with Fig. 1.

Fig. 2, which is a more detailed representation of the arrangement of receiver R, of the group of connecting wires FC5, and of the field of points D, will now be referred to. We have been considering the case of Fig. 1 in which the group selection arrangement is constituted by two assemblies for group selection and only two directions DR1 and DR2 have been represented. The field of points is therefore limited to four points *d*11 and *d*12, in case of direction DR1, and *d*21 and *d*22 in case of direction DR2. Points *d*11 and *d*12 respectively correspond to outgoing junctions of direction DR1 connected to the assemblies for group selection EG1 and EG2. In the same way, points *d*21 and *d*22 corerspond to outgoing junctions of direction DR2 respectively connected to elements EG1 and EG2. One of the functions of the receiver is to hunt for an assembly for group selection liable to establish a connection between the incoming junction to which it is connected through the medium of the register and a free outgoing junction in the requested direction. The indication on the requested direction is transmitted to the receiver by well-known means from the register to which this receiver is connected. Register E which has been connected to a free receiver through the group of connecting wires FC3 transmits to it the indication on the requested outgoing direction. The receiver then causes the closure of contacts, such as FC511 and FC512, corresponding to the requested direction. It is to be understood that each group of connecting wires, such as FC5, associated with a receiver R, comprises as many contacts per direction, such as FC511, as there are assemblies for group selection. The receiver will thus ascertain the assembly (assemblies) for group selection liable to serve the call whenever a characteristic potential appears on one of the conductors RT1 and RT2. If several assemblies for group selection can serve the call, it selects one of them and it registers its identity to use it afterwards, as will be explained further on. The selecting and the registering of the identity of an assembly for group selection liable to serve the call can be simultaneously effected according to well-known methods by using a group of relays comprising as many relays as there are assemblies for group selection and by combining the circuits of these relays so that a single relay may remain operated.

Contacts FC521 and FC522 correspond to direction DR2 and their function is identical to that of contacts FC511 and FC512.

We shall now describe, in connection with Fig. 1, the establishment of a call between an incoming junction and an outgoing junction of a requested direction. When an incoming junction, such as JE1 is calling, the fact is ascertained by connecting circuit CCE1 which is connected to an input of register-finder CE and is also multiplied on inputs, for instance homologous ones, of the different assemblies for group selection EG1 and EG2. In the case under consideration, when a connecting circuit, such as CCE1, is calling, the register-finder CE causes, as explained above, the connection of the connecting circuit to a free register. Moreover, the testing circuit T associated with finder CE ascertains the identity of the calling connecting circuit and it transmits this identity through connection JT4 to the register E which then registers this indication. As explained above, the identity of the calling incoming connecting circuit is obtained from the input to which it is connected, which determines the position of the associated incoming junction on the different assemblies for group selection. The register then causes in circuit CCE1 the operation of a relay which connects the incoming junction JE1 to the register E through the medium of the channel established in the register-finder CE. The incoming junction JE1 then transmits the information about the requested direction to the register, according to a well-known process. The register now holds an indication on the identity of the calling incoming junction and, an indication on the identity of the requested outgoing direction. The register is then connected by means of the group of connecting wires FC3 to the receiving circuit R to which it transmits these indications which are then registered there. As explained in connection with Fig. 2, the receiving circuit then causes the connection of the selecting relays to the points of the field of points of circuit D corresponding to the requested outgoing junction. It receives in return the indication on the assemblies for group selection liable to serve the call and it selects one of them. It will be assumed that the call can be served by the assembly for group selection EG1. The receiver is then connected to a free marker, MG11 for instance, associated with the element for group selection which has just been determined, i.e. EG1, thanks to the closure of the contact represented diagrammatically at FC411 of the group of connecting wires FC4 by means of which the receiver under consideration has access to each of the markers of the group selection arrangement. The receiving circuit then transmits to the marking circuit to which it is connected the indication on the identity of the incoming junction as well as the indication on the requested outgoing direction. These indications are registered in marker MG11 which is then connected by means of the group of connecting wires FC1 to the set of connecting relays RC11 corresponding to the group selection unit SG11 where connecting circuit CCE1 is linked. Marking circuit MG11 then controls the establishment of a connection between the calling incoming junction and a free outgoing junction in the requested direction. This connection is effected according to a well-known method; in our application for "Switching Systems Applicable in Particular to Automatic Telephony," Serial No. 485,555, filed February 1, 1955, a description of a group selection unit, suitable for use in the case under consideration after being modified in a manner obvious to the skilled personnel, has been given. The receiving circuit, whose functions are over, is then released and it is available for another call. If the functions of the register are over, this circuit is released. If the register must control further selections, it remains connected to circuit CCE1 through the connecting channel established in the register-finder CE; through circuit CCE1, the registering circuit supervises the incoming junction JE1 and the outgoing junction connected through the connecting channel established in the group selection unit SG11, as explained above. The marker MG11 which has hunted for the connection and established it within the group selection unit SG11 is released as soon as this connection has been established. The register is therefore actually connected between the calling incoming junction JE1 and the outgoing junction and it can be used to transmit indications to the long-distance exchange through the medium of the outgoing junction, these indications having been imparted to it by the calling incoming junction, for instance, after the indications about the outgoing junction. When the functions of the register are over, it causes the establishment of a circuit through connecting circuit CCE1, a metallic one, for instance, between the incoming junction JE1 and the outgoing junction, JS1 for instance.

We have explained, in connection with Fig. 1, the specific case of a group selection arrangement which carries out features of the invention and whose basic circuit is a group selection unit which is in the case under consideration a unit of 400 outputs, each input having access to each output through a channel.

It is obvious that group selection units comprising a different number of inputs and outputs might have been used in such an embodiment and that each input might have access to each output through several connecting channels within the group selection unit. Yet, it is necessary to point out that when a "square" unit is used, that is to say a unit comprising an equal number of inputs and outputs, it is possible to fulfil the particular working conditions by multipling inputs, by multipling outputs or by multipling both inputs and outputs. From the standpoints of the working conditions, three parameters must be taken into consideration: first, the number of incoming junctions, secondly, the number of outgoing junctions; then, the traffic to be dispatched. In the specific example of Fig. 1, it has been assumed that the traffic under consideration could be dispatched by making use of group selection units in which each input had access to each output by means of a single circuit within the unit. However, if the traffic is larger than the one which has been considered, it is possible to fulfil the required conditions by increasing the number of channels within each group selection unit at the expense of the number of inputs and of the number of outputs. For example, if we first take into consideration group selection units of 400 inputs, 400 outputs and a connecting channel from each input to each output, it is possible to constitute a group selection unit comprising four connecting channels between each input and each output by multipling the inputs two by two and by multipling the outputs two by two. These conditions being fulfilled, it is then possible to obtain group selection units of 200 inputs, and 200 outputs, each input having access to each output through four connecting channels. Each assembly for group selection which is to receive 800 incoming junctions must therefore comprise 4 group selection units and enables the connection of the 200 outgoing junctions. In order to deal with the 800 outgoing junctions, it is therefore necessary to provide 4 assemblies for group selection such as EG1, Fig. 1.

If the conditions required of the group selection arrangement are altered, if, for instance, the number of the incoming junctions and the number of outgoing junctions are doubled, that is to say, if they respectively reach 1600, it is then possible to fulfil these new conditions in different ways.

According to the first method of extension, the input multiple in the group selection units may be, for instance, suppressed, so that each group selection unit supplies 400 inputs. Each assembly for group selection thus enables the connection of 1600 incoming junctions and 200 outgoing junctions. It is to be understood that it is necessary under such conditions from the standpoint of the inputs to connect 8 assemblies in parallel for group selection in order to provide 1600 outputs to which the 1600 incoming junctions are connected. When such a method of extension is used, it is to be understood that the number of connecting channels within a group selection unit is brought to 2 and that each input has access to each output only through two connecting channels.

According to the second method of extension, it is possible to suppress the multiple on the side of the outgoing junctions so that each assembly for group selection supplies 400 outputs to connect 400 outgoing junctions, but such an assembly does not always allow the 800 incoming junctions to be connected. In order to bring the capacity of each assembly for group selection on the input side to 1600, the number of the group selection units of an assembly is increased, the assembly then comprises 8 group selection units, it still supplies 400 outputs owing to the output multiple, but it supplies on the input side of the 1600 inputs necessary for the connection of the outgoing junctions. It will be readily understood that the number of assemblies is not altered in this case. Like the first method of extension, this second method brings to 2 the number of the connecting channels within a group selection unit.

According to the third method of extension, it is possible to suppress both input and output multiples so that each assembly for group selection supplies 1600 inputs for 1600 incoming junctions and 400 outputs for 400 outgoing junctions. In this case, neither the number of group selection units per assembly for group selection nor the number of assemblies for group selection is altered, but the number of connecting channels per group selection unit is brought to 1.

According to the fourth method of extension, it is possible, without altering the multiple of the group selection units in an assembly, to double the number of these units per assembly and to double the number of assemblies; in this case, 1600 inputs per assembly and 200 outputs can be obtained so that the 8 assemblies enable the connection of the 1600 outgoing junctions, the number of connecting channels per group selection unit remaining equal to 4.

The selection of the particular method for effecting an extension is of course determined in relation to the particular mode of multiple existing in the group selection arrangement before the extension and also in relation to the particular conditions required by the new traffic conditions. By carrying out one of the four methods mentioned above, it is possible to obtain a group selection arrangement in which each unit comprises from 1 to 4 connecting channels between each input and each output. It is yet to be clearly understood that these four general methods have only been given by way of example and that it is easy to provide in particular a method of extension in such a way that each group selection unit comprises for a given number of inputs and outputs a number of connecting channels predetermined between each input and each output. The advantage of the group selection arrangement lies chiefly in the ease and readiness with which it is possible to effect an extension without any internal modification of the group selection units owing to the fact that the multiples are effected only on the outside (inputs and outputs) of the group selection units which can therefore be made as standardized circuit units.

Although the present invention has been described in reference to a specific embodiment, it is not obviously limited to said embodiment and it is liable to variants and modifications without falling beyond its scope.

What is claimed is:

1. A group selection arrangement comprising A input circuits and B output circuits, a plurality of identical group selection units, each comprising $n$ inputs and $p$ outputs, means for connecting $$\frac{A}{n}\times\frac{B}{p}$$

group selection units to form $$\frac{B}{p}$$

assemblies of $$\frac{A}{n}$$

units, where A is a multiple of $n$ and B is equal to $$\frac{Ap}{n}$$

means for multipling each input circuit to corresponding inputs in each of said assemblies, means for connecting each output circuit to a single assembly, and means for multipling said output circuit within said assembly to corresponding outputs of each unit of said assembly.

2. A group selection arrangement comprising a plurality of identical group selection units arranged in assemblies, a plurality of incoming junctions, a plurality of outgoing junctions, a plurality of registers, means having access to said incoming junctions and to said registers and responsive to a calling incoming junction for connecting said calling incoming junction to a free register and for transmitting an indication of the identity of said incoming junction to said connected register, said register being adapted to receive and register said indication and subsequently to receive and register the indication of a requested group of outgoing junctions from said calling incoming junction and to transmit said indications, a plurality of markers, there being at least one marker in common for the selection units of each assembly, means having access to said outgoing junctions and to said registers and adapted to receive said indications for hunting for and selecting the selection units to which said calling incoming junction and a free outgoing junction corresponding to said indications are connected and for connecting said register to a marker for the selected selection unit, and means in said register for transmitting the indication of said calling incoming junction and the indication of the requested group of outgoing junctions to said connected marker.

3. A group selection arrangement, as defined in claim 2, in which each assembly has $$\frac{B}{p}$$

group selection units on whose inputs $n$ incoming junctions are multipled, $p$ being equal to the number of outputs per unit and B being equal to $p$ or a multiple thereof said group selection units having access to B outgoing junctions.

4. A group selection arrangement, as defined in claim 2, in which the means having access to the incoming junctions and the registers comprises an incoming-junction-register-finder circuit having an input for each incoming junction and an output for each register, the incoming junctions being multipled to said last-mentioned inputs and to the inputs of respective selector units in the assemblies, and means for detecting a calling condition on an incoming junction, for identifying the calling incoming junction, for connecting said calling incoming junction to a free register, and for transmitting an indication of the identity of said calling incoming junction to said register.

5. A group selection arrangement, as defined in claim 4, further comprising means connected between the outgoing junctions and the means having access thereto for providing a continuous indication of the availability of at least one outgoing junction in each group thereof connected to the same selection unit assembly.

6. A group selection arrangement, as defined in claim 2, in which each group selection unit comprises a plurality of switching devices each having the same number of inputs as outputs, said units being adaptable to specific requirements by multipling a number of inputs, a number of outputs, or a number of inputs and a number of outputs.

References Cited in the file of this patent

UNITED STATES PATENTS

| | | |
|---|---|---|
| 2,598,412 | Modee | May 27, 1952 |
| 2,725,428 | Bellamy et al. | Nov. 29, 1955 |
| 2,741,663 | Oberman | Apr. 10, 1956 |